US012675283B2

(12) United States Patent
Izzo et al.

(10) Patent No.: US 12,675,283 B2
(45) Date of Patent: Jul. 7, 2026

(54) FIRMWARE VALIDATION FOR FIRMWARE UPDATES

(71) Applicant: Micron Technology, Inc., Boise, ID (US)

(72) Inventors: Niccolò Izzo, Vignate (IT); Alessandro Orlando, Milan (IT); Danilo Caraccio, Milan (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,768

(22) Filed: Jul. 16, 2024

(65) Prior Publication Data

US 2025/0117209 A1 Apr. 10, 2025

Related U.S. Application Data

(60) Provisional application No. 63/543,482, filed on Oct. 10, 2023.

(51) Int. Cl.
| | |
|---|---|
| *G06F 8/65* | (2018.01) |
| *G06F 21/57* | (2013.01) |
| *H04L 9/08* | (2006.01) |

(52) U.S. Cl.
CPC ............... *G06F 8/65* (2013.01); *G06F 21/57* (2013.01); *H04L 9/0825* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 9,507,581 | B2 | 11/2016 | Butcher et al. |
| 9,594,910 | B2 | 3/2017 | Sarangdhar et al. |
| 10,509,908 | B2 | 12/2019 | Zarakas et al. |
| 11,210,079 | B2 | 12/2021 | Fassino et al. |

(Continued)

FOREIGN PATENT DOCUMENTS

| | | |
|---|---|---|
| CN | 109840104 A | 6/2019 |

OTHER PUBLICATIONS

International Search Report and Written Opinion from related international application No. PCT/US2024/048558, dated Sep. 26, 2024, 12 pages.

*Primary Examiner* — Simon P Kanaan
(74) *Attorney, Agent, or Firm* — Brooks, Cameron & Huebsch, PLLC

(57) ABSTRACT

Methods, systems, and devices related to firmware validation for firmware updates are disclosed. A controller can, in association with a firmware update of a memory module: determine whether first security information and first customer information of a manifest of a firmware package are valid using second security information and second customer information, respectively, stored by a non-volatile memory device of the memory module; determine whether a first public key of a first image of the firmware package is valid using a second public key of the manifest corresponding to the first image and associated with the first security information and the first customer information; and determine whether a third public key of a second image of the firmware package is valid using a fourth public key of the manifest corresponding to the second image and associated with the first security information and the first customer information.

20 Claims, 3 Drawing Sheets

(56)          References Cited

U.S. PATENT DOCUMENTS

| | | |
|---|---|---|
| 2014/0095857 A1 | 4/2014 | Djabarov et al. |
| 2020/0279044 A1* | 9/2020 | Lum ......................... G06F 8/65 |
| 2021/0056208 A1* | 2/2021 | Gore .................... H04L 9/3239 |
| 2021/0357198 A1* | 11/2021 | Cherches ............ H04L 63/0823 |
| 2022/0100861 A1 | 3/2022 | Sayyed et al. |
| 2023/0273788 A1* | 8/2023 | Marx ................... H04L 9/3066 |
| | | 717/168 |
| 2023/0281312 A1 | 9/2023 | Hong et al. |
| 2024/0028735 A1* | 1/2024 | Savage ................ H04L 9/0891 |
| 2025/0061202 A1* | 2/2025 | Kim ...................... H04L 9/0656 |
| 2025/0117209 A1* | 4/2025 | Izzo ......................... G06F 8/65 |

* cited by examiner

FIRMWARE VALIDATION FOR FIRMWARE UPDATES

PRIORITY INFORMATION

This application claims the benefit of U.S. Provisional Application No. 63/543,482, filed on Oct. 10, 2023, the contents of which are incorporated herein by reference.

TECHNICAL FIELD

The present disclosure relates generally to semiconductor memory and methods, and more particularly, to apparatuses, systems, and methods of firmware validation for firmware updates.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes Random Access Memory (RAM), Dynamic Random Access Memory (DRAM), Static Random Access Memory (SRAM), Synchronous Dynamic Random Access Memory (SDRAM), and Thyristor Random Access Memory (TRAM), among others. Non-volatile memory can provide persistent data by retaining stored data when not powered and can include NAND flash memory, NOR flash memory, Ferroelectric Random Access Memory (FeRAM), and resistance variable memory such as Phase Change Random Access Memory (PCRAM), Resistive Random Access Memory (RRAM), and Magnetoresistive Random Access Memory (MRAM), such as Spin Torque Transfer Random Access Memory (STTRAM), among others.

Memory devices may be coupled to a host (e.g., a host computing device) to store data, commands (also referred to as requests), and/or instructions for use by the host while the computer or other electronic system is operating. For example, data, commands, and/or instructions can be transferred between the host and the memory device(s) during operation of a computer or other electronic system. A controller may be used to manage the transfer of data, commands, and/or instructions between the host and the memory devices.

DETAILED DESCRIPTION

Figure 1:
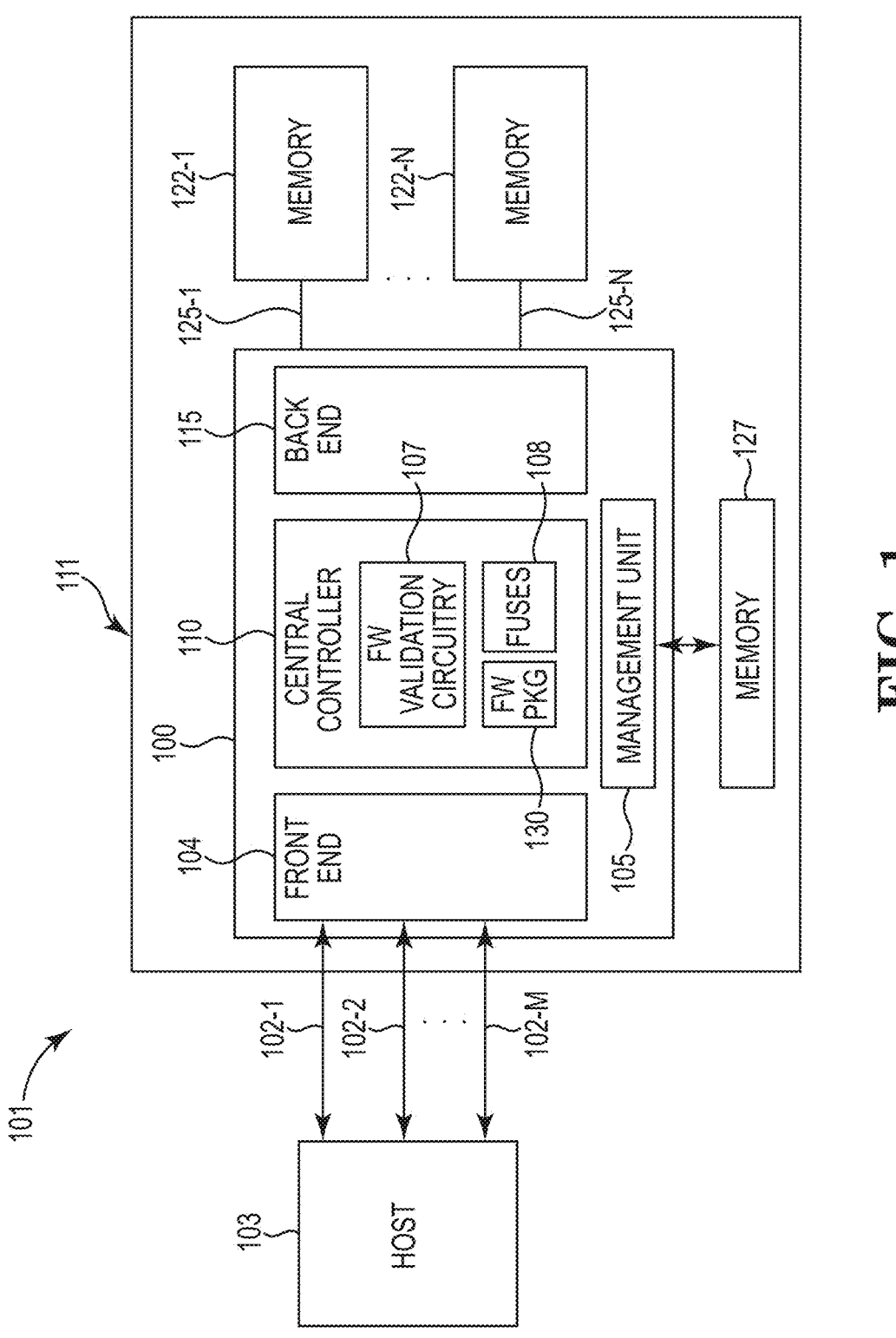
FIG. 1 illustrates a functional block diagram in the form of a computing system including a memory module including firmware validation circuitry in accordance with a number of embodiments of the present disclosure.

Systems, apparatuses, and methods related to firmware validation for firmware updates are described. As used herein, "firmware" refers to software installed on hardware (e.g., a memory module) for control and/or operation of the hardware. Firmware can contain functions of hardware and provide hardware abstraction services to higher-level software such as operating systems. As used herein, "validate" refers to determining whether a data structure (e.g., a key, an image, etc.) is valid or invalid. A memory module, and memory devices thereof, can be equipped with a controller that can update firmware of the memory module. A firmware update can be performed to resolve security issues identified in previous firmware versions, for example. Such security issues of previous firmware versions may make the memory module, and a system including the memory module, vulnerable to attack. As such, an attack may include reverting the firmware of the memory module to a previous version to exploit a vulnerability of that previous version.

One such attack is referred to as a roll back attack. A roll-back attack enables outdated code to be executed and patched vulnerabilities to be exploited. A roll back attack can include providing a firmware package to a memory module that reverts the firmware to a previous version. The firmware package can be intended for the memory module being attacked or intended for a different memory module (e.g., a different model, manufacturer, etc.) than the memory module being attacked.

A firmware package can include multiple images. As used herein, an "image" of a firmware package refers to a subset of data of the firmware package. A firmware package may be split into one or more images to accommodate limited memory resources of a memory module (or memory devices thereof) available to perform a firmware update. For instance, the size of an image of a firmware package can be based on the storage space of memory resources of a memory module available during firmware updates. Firmware code associated with the firmware package can be executed, in association with a firmware update, sequentially and/or concurrently. An example attack, referred to as a firmware mix and match, utilizes images from different firmware versions in combination to create a vulnerability that can be exploited. Another example attack takes advantage of a manufacturer or vendor using a single firmware version for multiple customers. One or more features of a firmware version may be enabled for customer "A" but disabled for customer "B." By attempting to use an image of a firmware package intended for customer "A" when updating the firmware for customer "B," firmware intended for customer "A" to be ran on a platform of customer "B," thereby unlocking features that are unauthorized for customer "B." Some previous approaches may reduce or prevent roll back attacks only for monolithic images of a firmware package.

Aspects of the present disclosure address the above and other deficiencies of previous approaches. Some embodiments of the present disclosure include using information of a memory module, or memory devices thereof, to reduce or prevent attacks via unauthorized firmware updates. Non-limiting examples of such information can include a Device Security Version (DSV), a Device Customer ID (DCID), and a Manifest Verification Key (MVK). As used herein, a "DSV" refers to a monotonic counter of a memory module (e.g., a monotonic counter of one or more memory devices of a memory module) that is increased with each authorized firmware update. As used herein, a "DCID" refers to a unique identifier corresponding to a particular customer associated with a memory module (or memory devices thereof), which can be stored, for example, in read-only memory of the memory module. As used herein, an "MVK" refers to a public key, which can be stored, for example, in read-only memory of a memory module (or memory devices thereof) that is used to verify the integrity of a manifest of a firmware package.

In some embodiments, a firmware package can include a Firmware Security Version (FSV) and/or a Firmware Customer ID (FCID). As used herein, an "FSV" refers to a unique identifier corresponding to the version of firmware included with the firmware package. As used herein, an "FCID" refers to a unique identifier corresponding to a particular customer for which the firmware package is intended. As described further in FIG. 2, A firmware package (e.g., 230) can include multiple images (e.g., 234-1, 234-2, . . . , 234-N), each of which can be individually signed with a respective private key, and the signatures can be validated using corresponding respective public keys. As an example, the signatures can be cryptographic signatures such as Rivest-Shamir-Adleman (RSA) signatures or Elliptic Curve Digital Signature Algorithm (ECDSA) signatures; however, embodiments are not so limited.

In some embodiments, a firmware package can include a manifest (e.g., a key manifest such as manifest 232 shown in FIG. 2) in which public keys (e.g., 248) used to validate individual images of the firmware package are embedded. Validating individual images can include validating signatures (e.g., 240-1, 240-2, . . . , 240-N) corresponding to the images. Including one or more public keys in a manifest can reduce a quantity of public keys maintained on the memory module 111, thereby reducing the storage space used by storing public keys. The manifest itself can be verified by comparing an MVK (e.g., public key) of the manifest to an MVK stored on a memory device. The manifest can also be signed using a signature generated via a private key corresponding to the MVK. Accordingly, once the MVK of the manifest is authenticated (e.g., via a determined match with the MVK stored on the memory device), the authenticated MVK can be used to validate the signature of the manifest, which provides validation of the manifest itself. Some embodiments of the present disclosure provide protection from attacks on a memory module via firmware updates and/or changes (e.g., a roll back attack) via regeneration of public keys of a manifest. An FSV and/or FCID of a firmware package can be embedded in a manifest of that firmware package. Prior to updating and/or changing the firmware of a memory module with a firmware package, the FSV and/or FCID of the firmware package can be compared to the DSV and/or DCID, respectively, of the memory module. In some embodiments, such a comparison can be performed during validation of the manifest of the firmware package. The public keys of a manifest, which correspond to respective firmware images, can be regenerated in association with respective firmware updates. As a result of the regeneration of public keys upon each firmware update, prior versions of the respective constituent firmware images of a firmware package will fail validation (e.g., will be determined to be invalid) due to the outdated/invalid public keys corresponding thereto. For example, outdated/invalid public keys will be unable to validate the image signatures generated via the corresponding private keys.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like. The terms "data" and "data values" are used interchangeably herein and can have the same meaning, as appropriate to the context.

The figures herein follow a numbering convention in which the first digit or digits correspond to the drawing figure number and the remaining digits identify an element or component in the drawing. Similar elements or components between different figures may be identified by the use of similar digits. For example, element 130 can represent element 30 in FIG. 1, and a similar element can be labeled 230 in FIG. 2. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates a functional block diagram in the form of a computing system 101 including a memory module 111 including firmware (FW) validation circuitry 107 in accordance with a number of embodiments of the present disclosure. The computing system 101 includes a memory module 111. The memory module 111 can include a controller 100 (which may also be referred to herein as a "memory controller") and one or more memories and/or memory devices coupled thereto.

The controller 100 can include a front end portion 104, a central controller portion 110, and a back end portion 115. The computing system 101 can further include a host 103, memory devices 122-1, . . . , 122-N (collectively referred to as memory devices 122), and a memory 127. The memory 127 can be a flash memory accessible via a serial peripheral interface (SPI). The memory 127 can include other circuitry, firmware, software, or the like, whether alone or in combination.

The front end portion 104 includes an interface to couple the controller 100 to the host 103 through input/output (I/O) lanes 102-1, 102-2, . . . , 102-M (collectively referred to as I/O lanes 102). The front end portion 104 includes interface management circuitry to manage the I/O lanes 102. The front end portion 104 can include any quantity of the I/O lanes 102 (e.g., eight, sixteen I/O lanes 102). In some embodiments, the I/O lanes 102 can be configured as a single port. In some embodiments, the interface between the controller 100 and the host 103 can be a Peripheral Component Interconnect express (PCIe) physical and electrical interface operated according to a Compute Express Link (CXL) protocol.

In some embodiments, the computing system 101 can be a CXL compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface.

The back end portion 115 can include media control circuitry and a physical (PHY) layer that couples the controller 100 to the memory devices 122. As used herein, the term "PHY layer" generally refers to the physical layer in the Open Systems Interconnection (OSI) model of a computing system. The PHY layer can be the first (e.g., lowest) layer of the OSI model and used to transfer data over a physical data transmission medium. In some embodiments, the physical data transmission medium can include channels 125-1, . . . , 125-N (collectively referred to as the channels 125). The channels 125 can include a sixteen-pin data bus and a two pin data mask inversion (DMI) bus, for example, among other possible buses. The channels 125 can each include an input/output data (DQ) bus and a data strobe (DQS) bus. The back end portion 115 can communicate (e.g., transmit and/or receive) data to and/or from the memory devices 122 via the data pins.

One or more of the memory devices 122 can include DRAM. DRAM can be operated according to a protocol, such as low-power double data rate (LPDDRx), (e.g., LPDDRx DRAM devices, LPDDRx memory, etc.). The "x" in LPDDRx refers to any of a number of generations of the protocol (e.g., LPDDR5). In some embodiments, at least one of the memory devices 122 is operated as an LPDDRx DRAM device with low-power features enabled and at least one of the memory devices 122 is operated as an LPDDRx DRAM device with at least one low-power feature disabled. In some embodiments, the memory devices 122 are LPDDRx memory devices, but the memory devices 122 do not include circuitry configured to provide low-power functionality, such as a dynamic voltage frequency scaling core (DVFSC), a sub-threshold current reduce circuit (SCRC), or other low-power functionality providing circuitry. The LPDDRx memory devices 122 without such circuitry can advantageously reduce the cost, size, and/or complexity of the LPDDRx memory devices 122. By way of example, an LPDDRx memory device with reduced low-power functionality providing circuitry can be used for applications other than mobile applications (e.g., if the memory is not intended to be used in a mobile application, some or all low-power functionality can be sacrificed for a reduction in the cost of producing the memory). One or more of the memory devices 122 can include FeRAM, PCRAM, RRAM, MRAM, and STTRAM, among others.

The memory devices 122 are not limited to a particular type of memory device. For instance, the memory devices 122 can include RAM, ROM, DRAM, SDRAM, PCRAM, RRAM, and flash memory, among others. The memory devices 122 can include non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XPoint) memory device, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the FeRAM device can exhibit a polarization reversal that yields non-linear dielectric behavior.

As another example, a 3D XPoint array of non-volatile memory can perform bit storage based on a change of bulk resistance, in conjunction with a stackable cross-gridded data access array. Additionally, in contrast to many flash-based memories, 3D XPoint non-volatile memory can perform a write in-place operation in which a non-volatile memory cell can be programmed without the non-volatile memory cell being previously erased.

In some embodiments, the controller 100 can include a management unit 105 to initialize, configure, and/or monitor characteristics of the controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the controller 100. As used herein, the term "out-of-band data and/or commands" generally refers to data and/or commands transferred through a transmission medium that is different from the main transmission medium of a network. For example, out-of-band data and/or commands can be data and/or commands transferred to a network using a different transmission medium than the transmission medium used to transfer data within the network.

In some embodiments, the management unit 105 can be configured to perform firmware updates in accordance with the present disclosure. However, embodiments of the present disclosure are not so limited. For example, other portions, components, and/or circuitry of the controller 100 can be configured to perform firmware updates, individually or in combination, in accordance with the present disclosure.

The central controller portion 110 can control, in response to receiving a memory access request from the host 103, for example, performance of one or more memory operations. Non-limiting examples of memory operations include a memory operation to read data from a memory device 122 and an operation to write data to a memory device 122. In some embodiments, the central controller portion 110 can control writing of multiple pages of data substantially simultaneously.

As illustrated by FIG. 1, the central controller portion 110 can include the firmware validation circuitry 107. However, in some embodiments, the firmware validation circuitry 107 can be a component of a different portion of the controller 100 or external to the controller 100. In some embodiments, the firmware validation circuitry 107 can be a component of or coupled to a security execution environment (SEE) engine. A SEE engine can be a component of the central controller portion 110. In some embodiments, the firmware validation circuitry 107 can include, but is not limited to, a microcontroller, special purpose logic circuitry (e.g., a field programmable gate array (FPGA), an application specific integrated circuit (ASIC), etc.), or other suitable processor.

The firmware validation circuitry 107 can, in association with a firmware update of memory module 111, determine whether a FSV and/or a FCID of a manifest of a firmware package, such as firmware package (FW PKG) 130, are valid using a DSV and/or a DCID, respectively. Although FIG. 1 illustrates the firmware package 130 being stored by the central controller portion 110, one or more portions (e.g., manifest, images) of a firmware package received by the controller 100 can be stored in a non-volatile memory of the memory module 111, such as the memory 127, one or more of the memory devices 122, and/or the controller 100. The DSV, the DCID, and/or an MVK can be stored in a non-volatile memory of the memory module 111, such as the memory 127 and/or one of the memory devices 122. The MVK stored by the memory module 111 can be compared to an MVK of the manifest. In some embodiments, the memory 127 can be read-only memory (ROM) and can store instructions that can be executed by the controller 100 to provide secure functionalities, such as cryptographically verifying (e.g., validating) firmware according to a number of embodiments of the present disclosure.

In some embodiments, the firmware validation circuitry 107 can update (e.g., increment) a value of the DSV in response to receiving the firmware package, and subsequent firmware packages. In various embodiments, the counter corresponding to the DSV is configured such that it shall never overflow, which can ensure that the counter does not return to a prior value. The firmware validation circuitry 107 can determine whether a public key of an image of the firmware package is valid using a public key of the manifest corresponding to the image and associated with the FSV and the FCID. The firmware validation circuitry 107 can determine if another image of the firmware package is valid using another public key of the manifest corresponding to the other image and associated with the FSV and the FCID.

In some embodiments, the firmware validation circuitry 107 can prevent (e.g., cease) the firmware update in response to a determination that either the FSV or the FCID is invalid. In some embodiments, the firmware validation circuitry 107 can cause one or more fuses of the memory module 111, such as fuses 108, to be blown in response to a determination that either the FSV or the FCID or a public key of an image is invalid to prevent further attempts to attack the memory module via firmware updates. Although FIG. 1 illustrates the fuses 108 as being a component of the central controller portion 110, in some embodiments, the fuses 108 can be a component of a different portion of the controller 100, external to the controller 100, and/or a component of one or more of the memory devices 122. In some embodiments, the firmware validation circuitry 107 can determine whether public keys of the images are valid if the firmware validation circuitry 107 determines that the FSV and the FCID are valid. The firmware validation circuitry 107 can prevent the firmware update in response to the firmware validation circuitry 107 determining that one or more of the public keys of the images are invalid.

In some embodiments, the firmware validation circuitry 107 can, in association with a subsequent firmware update of the memory module 111, determine whether a different FSV and/or a different FCID of a different manifest of a different firmware package is valid using the DSV and/or DCID, respectively. The firmware validation circuitry 107 can determine whether a public key of an image of the different firmware package is valid using a public key of the manifest of the different firmware package corresponding to the image of the different firmware package and associated with the different FSV and the different FCID of the different firmware package. The firmware validation circuitry 107 can determine whether another public key of another image of the different firmware package is valid using another public key of the manifest of the different firmware package corresponding to the other image of the different firmware package and associated with the different FSV and the different FCID of the different firmware package.

Figure 2:
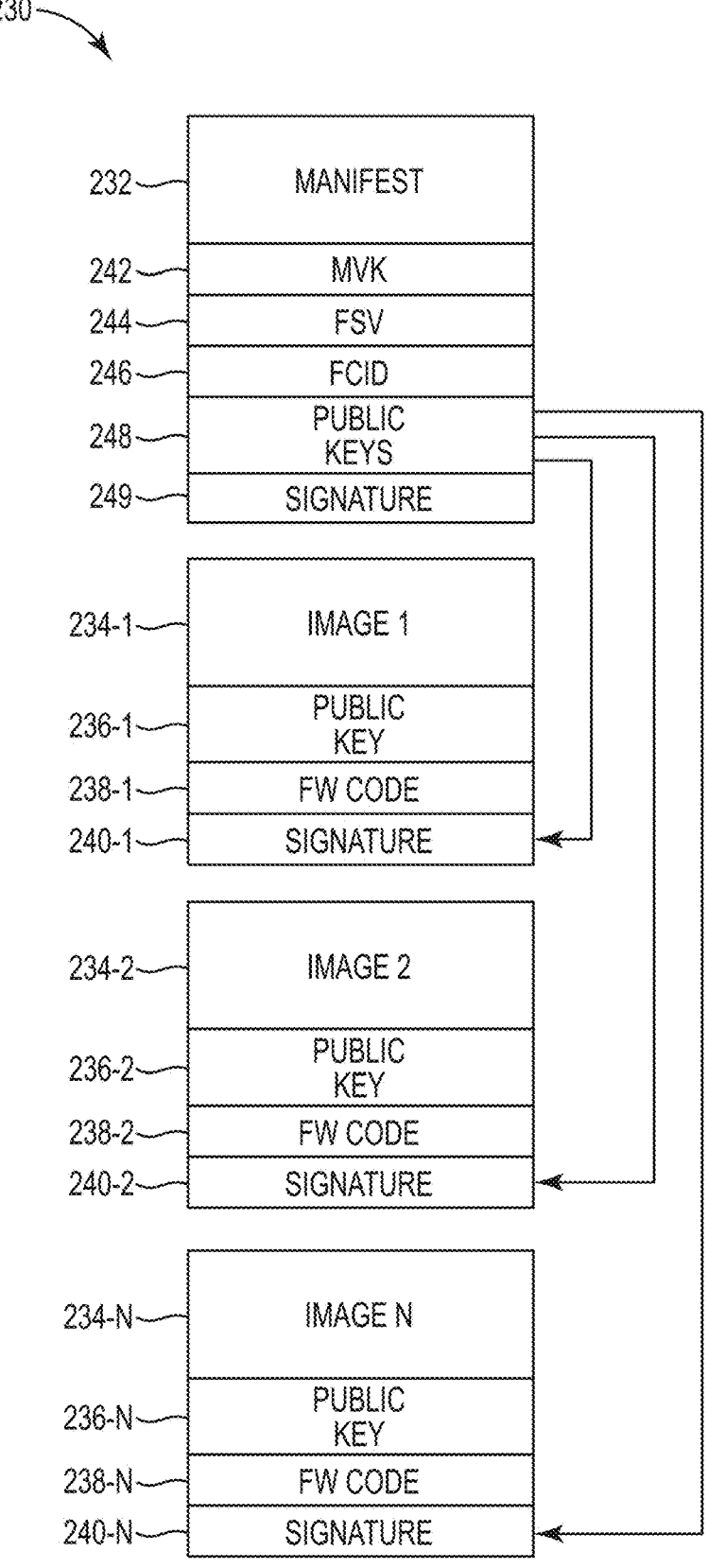
FIG. 2 illustrates a block diagram representation of a firmware package in accordance with a number of embodiments of the present disclosure.

FIG. 2 illustrates a block diagram representation of a firmware package 230 in accordance with a number of embodiments of the present disclosure. The firmware package 230 includes a manifest 232 and images 234-1, 234-2, . . . , 234-N (referred collectively as the images 234). The firmware package 230 can be analogous to the firmware package 130 described in association with FIG. 1.

The manifest 232 includes an MVK 242, which can be used by a memory module (e.g., the memory module 111 described in association with FIG. 1) and/or a controller thereof (e.g., the controller) to validate the manifest 232, and the firmware package 230. The MVK 242 can be a public key that can be validated based on a comparison to a corresponding MVK stored securely on a memory device (e.g., in memory 127 shown in FIG. 1) or burned into hardware via (e.g., via fuses 108). The manifest 232 includes an FSV 244, which can be compared to a DSV of a memory module to validate the firmware package 230. The manifest 232 includes an FCID 246, which can be compared to a DCID of a memory module to validate the firmware package 230. The manifest 232 is also signed with a signature 249, which is generated using a private key corresponding to the MVK 242.

Therefore, the firmware package 230 can be validated by confirming that the MVK 242 of the manifest 232 matches the MVK stored securely on the memory module, followed by utilizing the validated MVK 242 to authenticate the manifest signature 249. The manifest 232 includes public keys 248 used to validate each individual one of the images 234. As represented by the arrows illustrated in FIG. 2, each of the images 234-1, 234-2, . . . , 234-N is individually signed with a respective signature 240-1, 240-2, . . . 240-N (referred collectively as the signatures 240). The signatures 240 (and 249) can be, for example, Rivest-Shamir-Adleman (RSA) signatures or Elliptic Curve Digital Signature Algorithm (ECDSA) signatures; however, embodiments are not so limited. The respective corresponding ones of the public keys 248 can be compared to respective public keys 236-1, 236-2, . . . , 236-N (referred collectively as the public keys 236) of the images 234, by a memory module, to validate each of the images 234 individually. Each of the images 234 can have a unique public key. The public keys 236 can be associated with the FSV 244 and the FCID 246 such that the public keys 236 of a firmware package having particular FSV and FCID are different from the public keys 236 of a firmware package having different FSV and FCID.

Each of the images 234 has respective firmware code 238-1, 238-2, . . . , 238-N (referred collectively as the firmware code 238) corresponding to respective portions of the firmware update associated with the firmware package 230. The firmware code 238 The respective firmware code 238 of the images 234 can be executed one at a time and/or concurrently (e.g., respective firmware code 238 of two or more of the images 234 at the same time).

Figure 3:
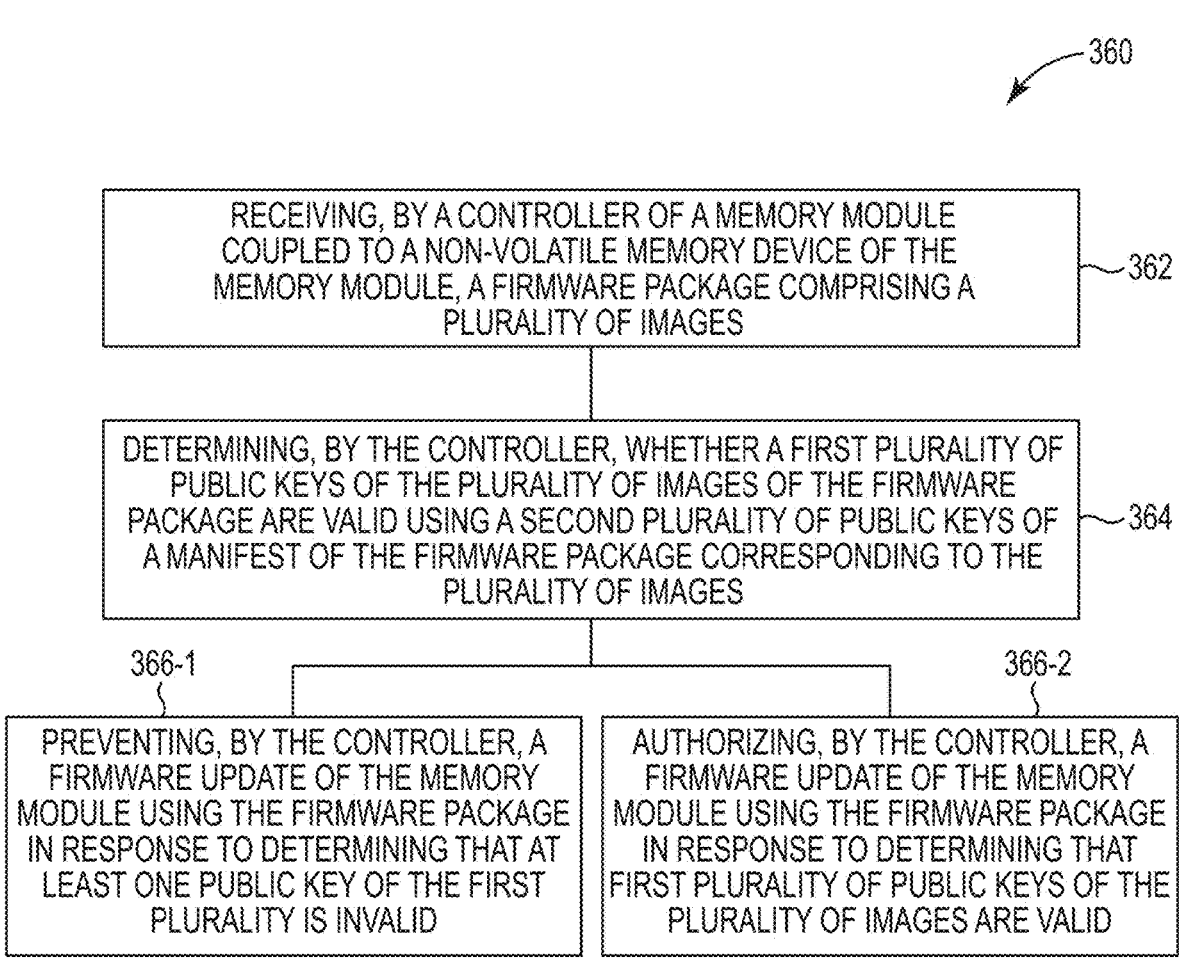
FIG. 3 illustrates a flow diagram of a method for firmware validation in accordance with a number of embodiments of the present disclosure.

FIG. 3 illustrates a flow diagram of a method 360 for firmware validation in accordance with a number of embodiments of the present disclosure. Any of the steps and operations of the method 360 can be performed by the firmware validation circuitry 107 described in association with FIG. 1, for example. The firmware validation circuitry 107 can include, but is not limited to, a microcontroller, special purpose logic circuitry (e.g., a field programmable gate array (FPGA), an application specific integrated circuit (ASIC), etc.), or other suitable processor.

At 362, the method 360 can include receiving, by a controller (e.g., the controller 100) of a memory module and coupled to a non-volatile memory device of the memory module (e.g., one or more of the memory devices 122), a firmware package including multiple images (e.g., images 234-1, 234-2, . . . , 234-N shown in FIG. 2). The firmware package can be received in association with a firmware update (e.g., security update), for example. At 364, the method 360 can include determining, by the controller, whether public keys corresponding to the respective images of the firmware package are valid using corresponding respective public keys of a manifest of the firmware package. For example, the public keys within the manifest can be used to validate the respective firmware images (e.g., by validating the corresponding signatures of the respective firmware images). Prior to determining whether the images are valid, the controller can determine whether an MVK of the manifest is valid (e.g., by comparing the MVK of the manifest to the MVK stored on the memory module). The validated MVK can subsequently be used to validate the manifest signature (e.g., 249). The firmware update associated with the firmware package can be authorized (or not), by the controller, based on whether or not the manifest signature and all of the respective image signatures are valid. For example, if any one of the image signatures is not able to be validated using the corresponding respective public keys of the manifest, then the firmware package fails validation and the firmware update is not authorized.

As shown at 366-1, the method 360 includes preventing (e.g., ceasing), by the controller, a firmware update of the memory module using the firmware package in response to determining that one or more of the public keys of the images is invalid (e.g., by determining that one or more of the corresponding respective public keys of the manifest do not match the public keys of the images). The controller can also prevent the firmware update responsive to a failure to validate the image signatures utilizing the public keys of the manifest. As shown at 366-2, the method 360 includes authorizing, by the controller, a firmware update of the memory module using the firmware package in response to determining that the public keys of the images are valid.

In some embodiments, the method 360 can include receiving, by the controller, a different firmware package including different images and determining, by the controller, whether public keys of the images of the different firmware package are valid using public keys of a manifest of the different firmware package corresponding to the images of the different firmware package. The public keys of the images and the manifest of the firmware package can be different than the public keys of the images and the manifest of the different firmware package. The method 360 can include preventing, by the controller, a different firmware update of the memory module using the different firmware package in response to determining that one or more public keys of the images of the different firmware package.

In some embodiments, the method 360 can include determining, by the controller, whether a FSV and a FCID of the manifest of the firmware package is valid using a DSV and a DCID, respectively, stored by the non-volatile memory device. The firmware update can be prevented, by the controller, in response to determining that validate the FSV and the FCID is invalid. The public keys of the images and/or the manifest can be associated with the FSV and the FCID. The method 360 can include receiving, by the controller, a different firmware package and determining, by the controller, whether a different FSV and a different FCID of a different manifest of the different firmware package is valid using the DSV and the DCID, respectively. A different firmware update using the different firmware package can be prevented, by the controller, in response to determining that the different FSV or the different FCID is invalid.

In some embodiments, a non-transitory medium can store instructions to validate respective public keys of images of a firmware package using a corresponding public keys of a manifest of the firmware package and, responsive to the respective public keys of the images being valid, performing a firmware update of a memory module using the images. The firmware update using the images can be prevented in response to at least one of the respective public keys of the images being invalid. In response to the firmware package being received by the memory module, a MVK of the manifest can be validated. In response to the MVK being valid, a FSV and/or a FCID of the manifest can be validated. In response to the FSV and the FCID being valid, validation of the respective public keys of the images can be initiated. In response to the FSV or the FCID being invalid, performance of the firmware update can be prevented.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a controller of a memory module coupled to a number of memory devices of the memory module and configured to, in association with a firmware update of the memory module:
determine whether a public key of a manifest of a firmware package is valid using a different public key stored by a non-volatile memory device of the memory module;
determine whether a signature of the manifest of the firmware package is valid using the public key;
determine whether first security information and first customer information of manifest of the firmware package are valid using second security information and second customer information, respectively, stored by the non-volatile memory device of the memory module;
determine whether a first public key of a first image of the firmware package is valid using a second public key of the manifest corresponding to the first image and associated with the first security information and the first customer information; and determine whether a third public key of a second image of the firmware package is valid using a fourth public key of the manifest corresponding to the second image and associated with the first security information and the first customer information.

2. The apparatus of claim 1, wherein the controller is configured to validate a signature of the manifest prior to determining whether the first security information and the first customer information of the manifest are valid.

3. The apparatus of claim 1, wherein the controller is further configured to prevent the firmware update in response to a determination that the first security information or the first customer information is invalid.

4. The apparatus of claim 1, wherein the controller is further configured to determine whether the first and third public keys are valid in response to a determination that the first security information and the first customer information are valid.

5. The apparatus of claim 1, wherein the controller is further configured to prevent the firmware update in response to a determination that the first public key or the third public key is invalid.

6. The apparatus of claim 1, wherein the controller is further configured to, in association with a subsequent firmware update of the number of memory devices:

determine whether different first security information and different first customer information of a different manifest of a different firmware package is valid using the second security information and second customer information, respectively;

determine whether a fifth public key of a third image of the different firmware package is valid using a sixth public key of the different manifest corresponding to the third image and associated with the different first security information and the different first customer information; and determine whether a seventh public key of a fourth image of the different firmware package is valid using an eighth public key corresponding to the fourth image and associated with the different first security information and the different first customer information.

7. The apparatus of claim 1, wherein the controller and the number of memory devices are components of a Compute Express Link (CXL) compliant memory system.

8. The apparatus of claim 1, wherein the second security information comprises a value of a monotonic counter, and wherein the controller is further configured to update the value of the monotonic counter in response to receiving the firmware package, wherein updating the value of monotonic counter includes blowing eFuses.

9. A method, comprising:

receiving, by a controller of a memory module coupled to a non-volatile memory device of the memory module, a firmware package comprising a plurality of images;

determining, by the controller, whether a first plurality of public keys of the plurality of images of the firmware package are valid using a second plurality of public keys of a manifest of the firmware package corresponding to the plurality of images, wherein the first plurality of public keys are associated with a Firmware Security Version (FSV) and a Firmware Customer Identification (FCID) of the manifest of the firmware package; and preventing, by the controller, a firmware update of the memory module using the firmware package in response to determining that at least one public key of the first plurality is invalid.

10. The method of claim 9, further comprising:

receiving, by the controller, a different firmware package comprising a different plurality of images;

determining, by the controller, whether a third plurality of public keys of the different plurality of images are valid using a fourth plurality of public keys of a different manifest of the different firmware package corresponding to the different plurality of images, and wherein the first and second pluralities of public keys are different from the third and fourth pluralities of public keys; and preventing, by the controller, a different firmware update of the memory module using the different firmware package in response to determining that at least one public key of the third plurality is invalid.

11. The method of claim 9, further comprising:

determining, by the controller, whether the FSV and the FCID of the manifest of the firmware package is valid using a Device Security Version (DSV) and a Device Customer Identification (DCID), respectively, stored by the non-volatile memory device; and preventing, by the controller, the firmware update in response to determining that the FSV and the FCID of the firmware package is invalid.

12. The method of claim 11, wherein the first and second pluralities of public keys are associated with the FSV and the FCID.

13. The method of claim 11, further comprising:

receiving, by the controller, a different firmware package; and determining, by the controller, whether a different FSV and a different FCID of a different manifest of the different firmware package is valid using the DSV and the DCID, respectively.

14. The method of claim 13, further comprising preventing, by the controller, a different firmware update of the memory module using the different firmware package in response to determining that the different FSV or the different FCID is invalid.

15. The method of claim 9, further comprising, prior to determining whether the first plurality of public keys are valid:

determining, by the controller, whether a manifest verification key (MVK) of the manifest is valid; and responsive to determining that the MVK is valid, using the MVK to determine whether a signature of the manifest is valid.

16. A non-transitory medium storing instructions executable by a processing device to:

validate respective public keys of a plurality of images of a firmware package using a corresponding plurality of public keys of a manifest of the firmware package, wherein the respective public keys are associated with a Firmware Security Version (FSV) and a Firmware Customer Identification (FCID) of the manifest of the firmware package; and responsive to at least one of the respective public keys of the plurality of images being valid, performing a firmware update of a memory module using the plurality of images.

17. The medium of claim 16, further storing instructions executable to, responsive to at least one of the respective public keys of the plurality of images being invalid, prevent the firmware update using the plurality of images.

18. The medium of claim 16, further storing instructions executable to, responsive to receipt of the firmware package by the memory module, validate a manifest verification key (MVK) of the manifest.

19. The medium of claim 18, further storing instructions executable to, responsive to the MVK being valid:

validate the FSV of the manifest of the firmware package; and validate the FCID of the manifest.

20. The medium of claim 19, further storing instructions executable to:

responsive to the FSV and the FCID being valid, initiate validation of the respective public keys of the plurality of images; and responsive to the FSV or the FCID being invalid, prevent performance of the firmware update.

\* \* \* \* \*